United States Patent [19]

Hrusch

[11] Patent Number: 5,894,666
[45] Date of Patent: Apr. 20, 1999

[54] CUTTING AND PIERCING TIPS FOR A METAL CUTTING SHEAR

[75] Inventor: Gerard J. Hrusch, Maple Heights, Ohio

[73] Assignee: NPK Research, Inc., Walton Hills, Ohio

[21] Appl. No.: 08/819,717

[22] Filed: Mar. 17, 1997

[51] Int. Cl.$^6$ .................. B02C 1/06; B02C 1/10
[52] U.S. Cl. .................. 30/134; 241/101.73
[58] Field of Search .................. 30/134; 241/101.73

[56] References Cited

U.S. PATENT DOCUMENTS

| | | |
|---|---|---|
| Re. 35,432 | 1/1997 | LaBounty . |
| 4,017,114 | 4/1977 | LaBounty . |
| 4,413,945 | 11/1983 | LaBounty . |
| 4,670,983 | 6/1987 | Ramun . |
| 4,719,975 | 1/1988 | LaBounty . |
| 4,776,093 | 10/1988 | Gross . |
| 4,799,852 | 1/1989 | Ramun . |
| 4,838,493 | 6/1989 | LaBounty . |
| 4,897,921 | 2/1990 | Ramun . |
| 4,951,886 | 8/1990 | Berto . |
| 5,044,569 | 9/1991 | LaBounty . |
| 5,187,868 | 2/1993 | Hall . |
| 5,230,151 | 7/1993 | Kunzman . |
| 5,339,525 | 8/1994 | Morikawa .................. 30/134 |
| 5,533,682 | 7/1996 | de Gier . |
| 5,671,892 | 9/1997 | Morikawa et al. .................. 241/101.73 |

*Primary Examiner*—Douglas Watts
*Attorney, Agent, or Firm*—Vickers, Daniels & Young

[57] ABSTRACT

One jaw of a heavy duty shear having relatively pivotal jaws is provided with piercing and cutting tip blades which provide linear cutting edges extending transverse to the pivot axis of the jaws and piercing edges extending parallel to the pivot axis. Each blade includes a plurality of cutting edges and piercing edges, and the blades are adapted to be both re-oriented and reversed with respect to an initial mounting disposition on the jaw for selectively positioning the cutting and piercing edges relative to cooperable blades on the other jaw of the shear.

21 Claims, 4 Drawing Sheets

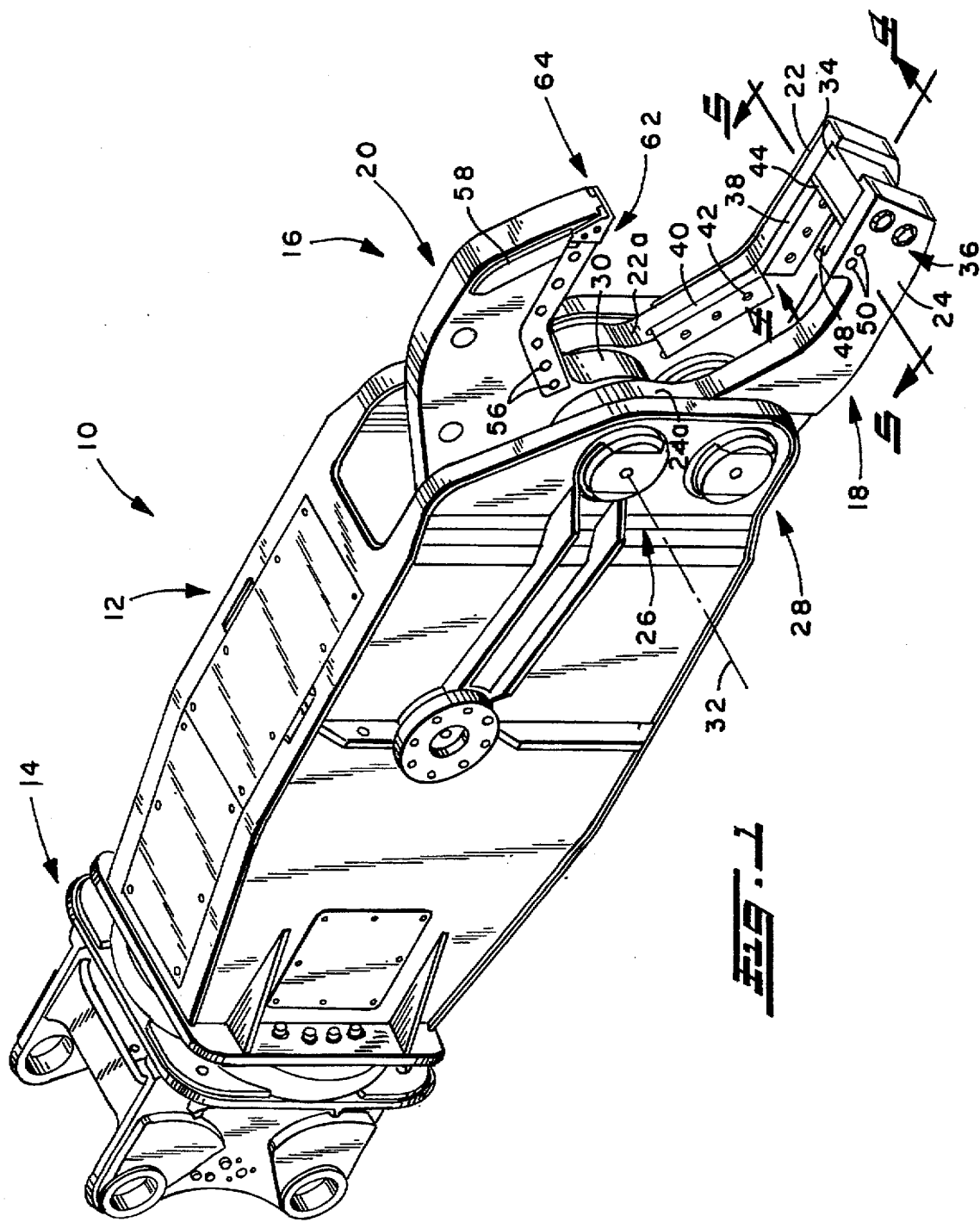

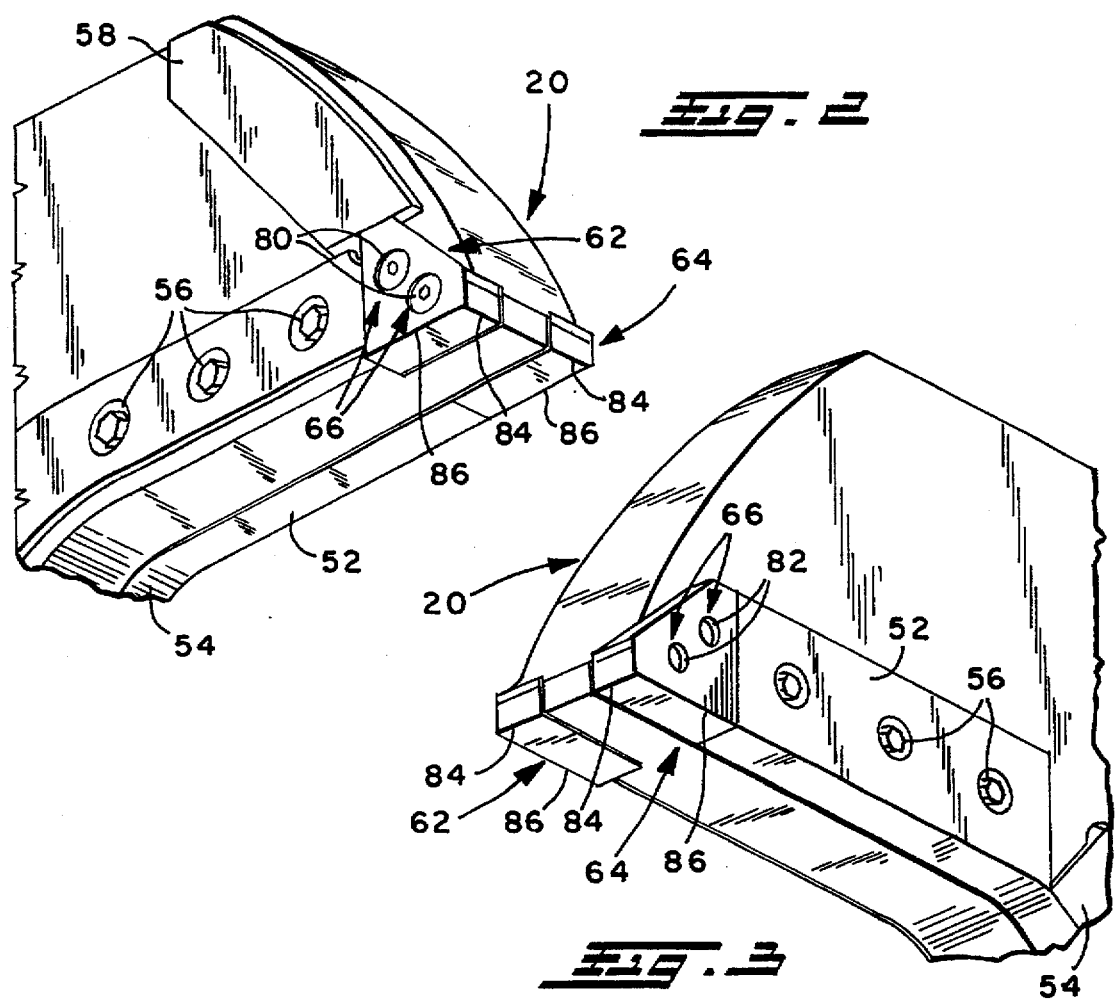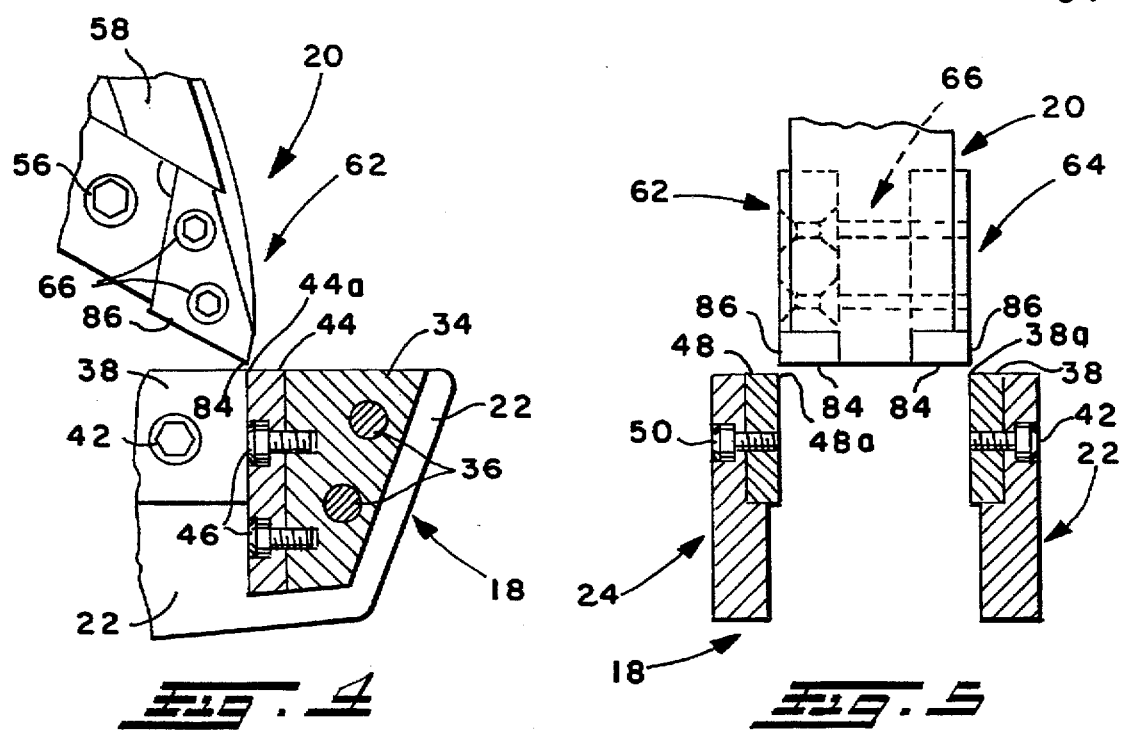

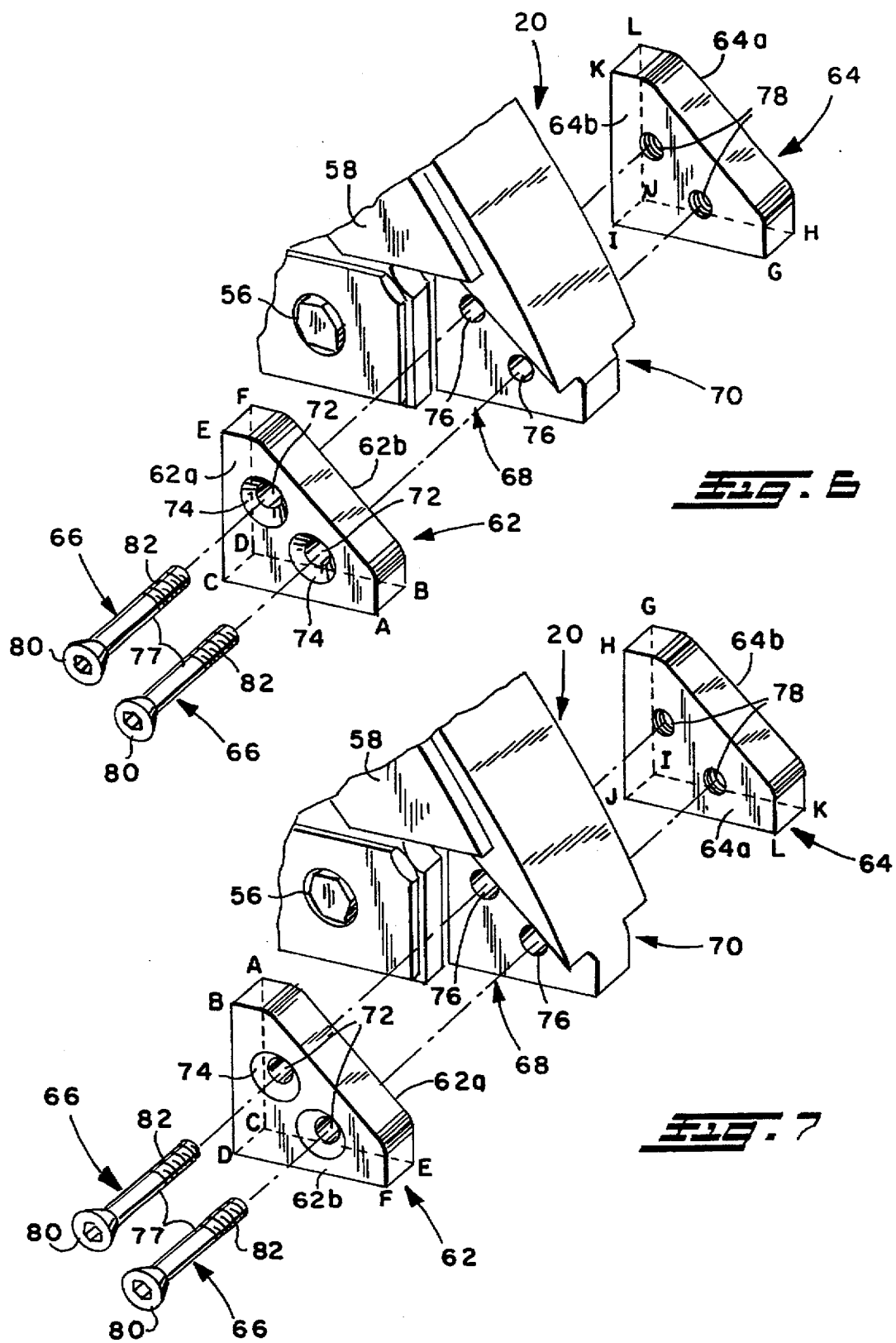

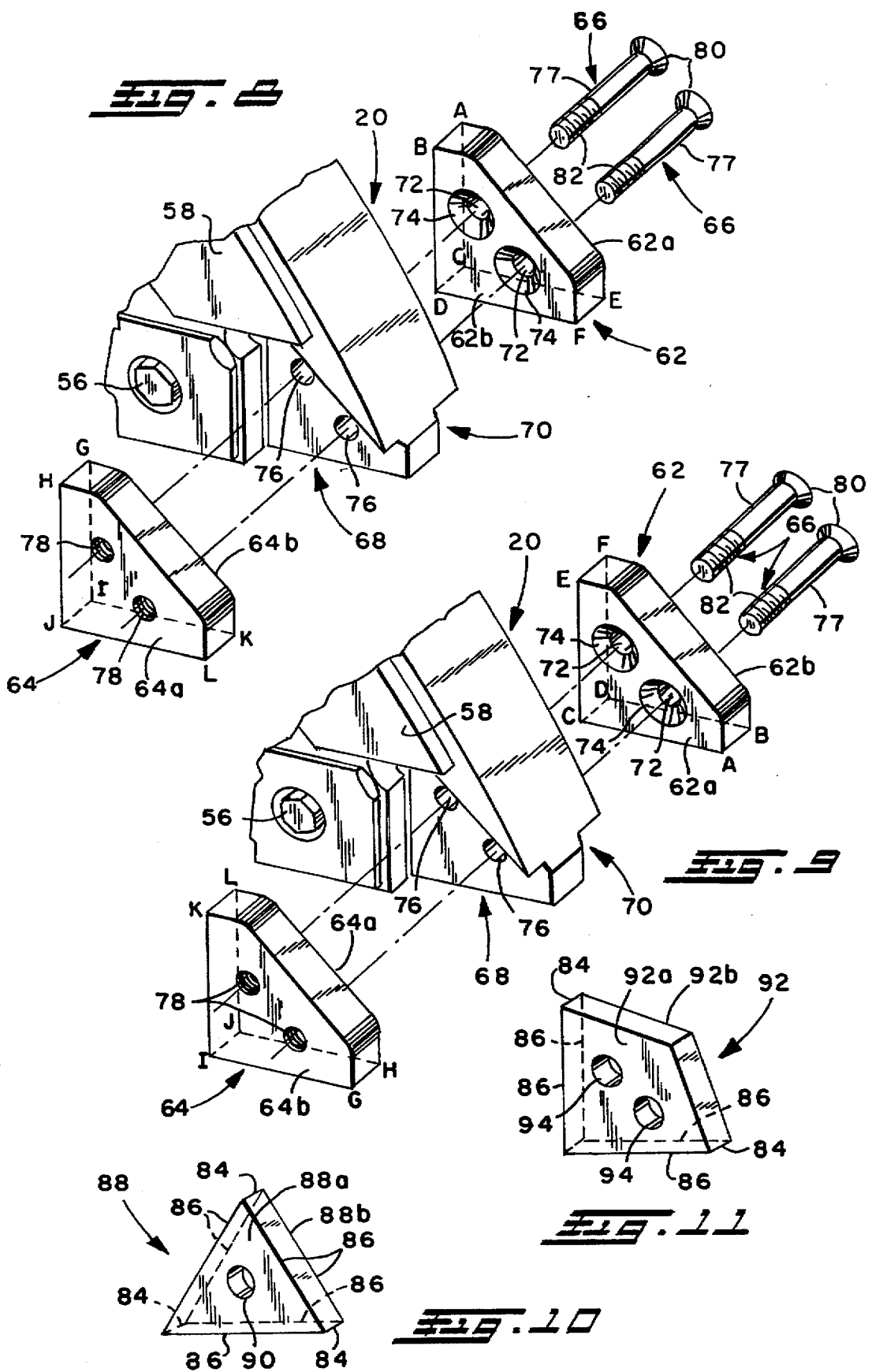

CUTTING AND PIERCING TIPS FOR A METAL CUTTING SHEAR

BACKGROUND OF THE INVENTION

The present invention relates to heavy duty shears of the type mountable on the boom of a mobile machine such as a backhoe and, more particularly, to improvements in connection with the cutting and piercing tip portion of the shearing jaws of such heavy duty shears.

Heavy duty shears of the type to which the present invention is directed are well known in conjunction with the handling and shearing of a wide variety of scrap materials including, for example, iron and steel pipes of various diameters, metal rod of various cross-sectional configurations and diameters, I-beams, channels, angles, and other structural metal components, as well as a variety of other metal and non-metal materials and material configurations. Generally, the shear head includes a supporting structure by which the head is adapted to be attached to the boom of a mobile machine such as a backhoe, and the shearing components or jaws are relatively pivotal and powered by a hydraulic piston and cylinder arrangement or arrangements actuated through the hydraulic system of the support vehicle. The relatively pivotal jaw components are provided with blade inserts providing cutting edges which are cooperable to shear a workpiece therebetween during displacement of the jaw components between open and closed positions relative to one another and, in many instances, the distal end of one of the jaw members is provided with a cutting and piercing tip arrangement by which a workpiece is pierced and severed during closure of the one jaw member relative to the other. Various prior art shears of the foregoing character are illustrated, for example, in U.S. Pat. No. 4,670,983 to Ramun, et al.; U.S. Pat. No. 4,776,093 to Gross; U.S. Pat. No. 5,187,868 to Hall; and U.S. Pat. No. 5,230,151 to Kunzman, et al., all of which patents are incorporated herein by reference for background information.

In heavy duty shears of the foregoing character which have cutting and piercing tip arrangements, the tip includes a piercing edge and a cutting edge or edges at right angles to the piercing edge and which piercing and cutting edges are respectively parallel to and perpendicular to the pivot axis of the jaw member on which the tip is provided. The other jaw member of the shear is provided with blade inserts providing linear cutting edges which are positioned for cooperable shearing relationship with the piercing and cutting edges of the tip of the one jaw member during relative pivotal displacement of the jaw members to a closed relationship relative to one another. The piercing and cutting edges of the tip are cooperable with the cutting edges of the blade inserts to pierce and sever a metal workpiece therebetween, and it will be appreciated that such jaw tips are subject to extreme wear and accordingly require frequent replacement. Replacement of the tips is expensive both from the standpoint of the cost of the tip component and the down time required to remove, repair and replace a damaged or worn tip component or, if beyond repair, to replace with a new tip component. In shearing apparatus heretofore available, the piercing and cutting tip component has been of a structural configuration or profile limiting the piercing and cutting edges to a single piercing and cutting edge configuration relative to the jaw member on which the tip is mounted. Accordingly, repair or replacement of the tip is required each time the piercing and cutting edges become worn or damaged, whereby maintenance costs and down time is undesirably high.

SUMMARY OF THE INVENTION

In accordance with the present invention, improved piercing and cutting tip arrangements are provided for a heavy duty shear which minimize or avoid the disadvantages encountered in connection with prior art piercing and cutting tip arrangements including those enumerated hereinabove. More particularly, a piercing and cutting tip component provided in accordance with the present invention can be selectively oriented relative to and mounted on the distal end of a jaw member of the shears so as to selectively position a different one of a plurality of cutting and piercing edges for shearing interrelationship with the other jaw member of the shears upon closure of the jaws. Thus, for example, when one cutting and piercing edge of the tip component becomes worn or damaged, the component can be removed and re-oriented relative to the distal end of the jaw member to provide sharp, unworn cutting edges in the operative positions thereof relative to the other jaw member of the shears. Accordingly, such re-orientation advantageously promotes a longer useful life for the piercing and cutting tip component by enabling the use thereof to provide a plurality of piercing and cutting edges to be used before it becomes necessary to replace the tip component.

In accordance with another aspect of the invention, a pair of piercing and cutting tip components are mounted on axially opposite sides of the jaw member of the shears. The two tip components are identical in peripheral contour, and each of the tip components provides a plurality of cutting and piercing edges respectively transverse to and parallel to the pivot axis of the jaw member. Further in accordance with this aspect of the invention, the positions of the two tip inserts are reversible with respect to the side of the jaw member on which they are initially mounted, and this reversibility optimizes the number of cutting and piercing edges available for use prior to the tip components having to be replaced. Thus, down time and maintenance time is further reduced as a result of the ability to both re-orient and reverse the mounting positions of the tip components, and this capability with respect to the tip components also promotes economy with respect to manufacturing the tip components and with respect to maintaining an inventory thereof In particular in this respect, an inventory heretofore required is reduced in that each tip component has a longer life than heretofore possible.

It is accordingly an outstanding object of the present invention to provide improvements in the piercing and cutting tip arrangements used in a heavy duty shear.

Another object is the provision of an improved piercing and cutting tip arrangement of the foregoing character which promotes efficiency and economy in connection with the use and maintenance of piercing and cutting tip components and which promotes the useful life of the tip components.

A further object is the provision of an improved piercing and cutting tip arrangement of the foregoing character comprising piercing and cutting tip components which are adapted to be selectively mounted in any one of a number of different orientations relative to a jaw member of the shears for selectively positioning a different one of a plurality of cutting and piercing edges on the tip component in shearing relation with the other of the jaw members of the shears.

Still another object is the provision of an improved piercing and cutting tip arrangement of the foregoing character wherein a plurality of piercing and cutting tip components are individually re-orientable in mounting and reversely mountable relative to one another so as to optimize the availability of sharp, unused cutting and piercing edges before repair and/or replacement of the tip components is necessary.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 1 is a perspective view of a heavy duty shear having a piercing and cutting tip arrangement in accordance with the present invention;

FIG. 2 is an enlarged perspective view showing the piercing and cutting tip arrangement as viewed from one side of the jaw member in FIG. 1;

FIG. 3 is an enlarged perspective view showing the piercing and cutting tip arrangement as viewed from the side of the jaw member opposite that shown in FIG. 2;

FIG. 4 is a sectional elevation view of the lower jaw member taken along line 4—4 in FIG. 1 and showing the piercing and cutting tip components in shearing relation therewith;

FIG. 5 is a sectional elevation view of the lower jaw member taken along line 5—5 in FIG. 1 and showing the piercing and cutting tip components in shearing relation therewith;

FIGS. 6–9 are exploded perspective views showing the re-orientation and reversible mounting capabilities of the piercing and cutting tip components according to the invention; and, FIGS. 10 and 11 are perspective views of alternative profiles for the piercing and cutting tip components.

DESCRIPTION OF PREFERRED EMBODIMENTS

Referring now in greater detail to the drawings, wherein the showings are for the purpose of illustrating preferred embodiments of the invention only and not for the purpose of limiting the invention, FIG. 1 illustrates a heavy duty shear 10 comprised of a support structure 12 having a rear end 14 for attaching the shear to the boom of a mobile machine such as backhoe, not shown. Support 12 has a front end 16 on which lower and upper jaws 18 and 20, respectively, are mounted for relative pivotal displacement toward and away from one another and between closed and open positions relative to one another. In the embodiment illustrated, lower jaw 18 is comprised of laterally spaced apart jaw plates 22 and 24 having corresponding inner ends 22a and 24a by which the lower jaw is fixed relative to and removably mounted on support 12 by means of upper and lower pin units 26 and 28, respectively. Upper jaw member 20 includes a leg 30 intermediate the opposite ends thereof and disposed between inner ends 22a and 24a of the lower jaw, and leg 30 interengages with pin unit 26 to support upper jaw 20 for pivotal displacement in opposite directions about pin axis 32 and thus, in the orientation shown in FIG. 1, downwardly and upwardly relative to lower jaw 18. Upper jaw 20 has an inner end, not shown, which is spaced inwardly of support 12 from leg 30, and a hydraulic piston and cylinder unit, not shown, is mounted in support 12 and connected to the inner end of upper jaw 20 for pivoting the latter in opposite directions about axis 32.

As best seen in FIGS. 1, 4 and 5, lower jaw plates 22 and 24 are laterally spaced apart and interconnected by a cross member 34 which is secured therebetween by nut and bolt assemblies 36. Lower jaw 18 further includes a pair of shearing blade inserts 38 and 40 mounted on the inner side of jaw plate 22 by machine screws 42, a shearing blade 44 mounted on the inner side of cross member 34 by machine screws 46, and a shearing blade 48 mounted on the inner side of jaw plate 24 and inwardly adjacent blade 44 by means of machine screws 50. As best seen in FIGS. 1–3, upper jaw 20 is provided on the side thereof facing lower jaw plate 22 with a pair of shearing blade inserts 52 and 54 removably mounted thereon by machine screws 56 and which, in a well known manner, are cooperable with blade inserts 38 and 40 on lower jaw 18 to sever a workpiece therebetween in response to displacement of the jaws to the closed position thereof. Upper jaw 20 is also provided on the side thereof facing lower jaw plate 24 with a wear plate 58 which, in a well known manner, is cooperable with the laterally inner side of lower jaw plate 24 to laterally stabilize the upper jaw relative to the lower jaw when the jaws move into the closed position in which the upper jaw is between lower jaw plates 22 and 24.

In accordance with the present invention, the distal end of upper jaw 20 is provided with a piercing and cutting tip arrangement which, in the embodiment illustrated in FIGS. 1–9, is comprised of piercing and cutting tip blade inserts 62 and 64 on axially opposite sides of jaw 20 and on the sides thereof respectively adjacent lower jaw plates 24 and 22. In FIGS. 1–5, blades 62 and 64 are shown in an initial position of mounting thereof on upper jaw 20 and, in the manner which will become apparent hereinafter, the blades are adapted to be re-oriented on the corresponding side of the jaw and reversed with respect to the side on which they were mounted and, in all of the positions thereof on the jaw, are removably interengaged therewith by a pair of threaded fastener elements 66.

Referring at this point to FIG. 6 of the drawing, it will be seen that the axially opposite sides of the distal end of upper jaw 20 are provided with piercing and cutting tip insert recesses 68 and 70 for respectively receiving inserts 62 and 64. In the embodiment illustrated, the blade inserts are generally triangular in peripheral configuration. More particularly, blade 62 includes planar, parallel opposite sides 62a and 62b and a pair of openings 72 extending therethrough and having countersunk outer ends 74 as shown in FIG. 6 in connection with the end of the opening communicating with side 62a of insert 62. As will become apparent hereinafter, openings 72 also have countersunk ends 74 on side 62b of the insert. The portion of the distal end of jaw 20 between recesses 68 and 70 therein is provided with a pair of openings 76 in alignment with openings 72 when blade 62 is in place. Blade 64 includes planar, parallel opposite sides 64a and 64b and a pair of threaded openings 78 extending therethrough in alignment with openings 72 and 76. Fasteners 66 comprise a shank 77 having a head 80 at one end and threads 82 at the opposite end whereby, as will be appreciated from the initially mounted positions of blades 62 and 64 shown in FIGS. 2 and 3, heads 80 of the fasteners engage in countersinks 74 in blade 62 and threaded ends 82 engage in threaded openings 78 in blade 64 to removably mount the blades on jaw 20.

Referring now to FIGS. 4 and 5 of the drawing, it will be seen that each of the piercing and cutting tip blades 62 and 64, when mounted on jaw 20, has a horizontally extending linear piercing edge 84 parallel to pivot axis 32 of the jaw and a linear cutting edge 86 extending inwardly of the jaw from the corresponding piercing edge and transverse to pivot axis 32. As will be further appreciated from FIGS. 4 and 5, piercing edges 84 are positioned on jaw 20 for cooperative shearing relation with cutting edge 44a of blade 44 on lower jaw 18 to pierce a workpiece therebetween when upper jaw 20 closes relative to the lower jaw. Likewise, cutting edges 86 of blades 62 and 64 are respectively positioned for cooperative shearing relation with edges 38a and 48a on shearing blade inserts 38 and 48 on lower jaw plates 22 and 24, respectively.

Referring again to FIG. 6 wherein cutting and piercing tip blades 62 and 64 are shown in the orientations thereof relative to jaw 20 providing an initial mounting position for the blades, it will be noted that blade 62 has corners A, B, C, D, E, and F and that blade 64 has corners G, H, I, J, K, and L. As will be appreciated from FIGS. 2–5 taken in connection with FIG. 6, in the initial mounted position of blades 62 and 64, edge AC of blade 62 and edge HJ of blade 64 provide the corresponding cutting edge 86, and edge AB of blade 62 and edge GH of blade 64 provide the corresponding piercing edge 84.

As mentioned above, each of the blades 62 and 64 is adapted to be re-oriented relative to the same side of jaw 20 on which it is initially mounted so as to present different cutting and piercing edges from those shown in FIG. 6. Such re-orientation of blades 62 and 64 is shown in FIG. 7 and is achieved by rotating the blades 180° about an axis bisecting the angle between the perpendicular edges thereof. Thus, blade 62 would be rotated 180° about an axis bisecting the angle between edges BD and DF and blade 64 would be rotated 180° about an axis bisecting the angle between edges GI and IK. When the blades have been re-oriented in this manner, it will be seen from FIG. 7 that cutting edges 86 are now defined by edge DF of blade 62 and edge IK of blade 64, and that piercing edges 84 are defined by edge EF of blade 62 and edge KL of blade 64.

Further in accordance with the preferred embodiment of the cutting and piercing tip blades, blades 62 and 64 are also adapted to be reversed with respect to the side of jaw 20 on which they are mounted and, when so reversed, to have initial and re-oriented positions of mounting relative to jaw 20. The initial reversed mounting of blades 62 and 64 is shown in FIG. 8 from which it will be appreciated that cutting edges 86 of the blades are now provided by edge CE of blade 62 and edge JL of blade 64 and that piercing edges 84 are now defined by edge EF of blade 62 and edge KL of blade 64.

Re-orientation of blades 62 and 64 when reversely mounted as shown in FIG. 8 is achieved in the same manner described hereinabove with regard to re-orienting the blades from the position shown in FIG. 6 to that shown in FIG. 7. When so re-oriented, the blades are in the positions shown in FIG. 9 from which it will be appreciated that cutting edges 86 are defined by edge BD of blade 62 and edge GI of blade 64 and that piercing edges 84 are defined by edge AB of blade 62 and edge GH of blade 64.

From the foregoing description, it will be appreciated that each of the piercing and cutting tip blades 62 and 64 provide four different cutting edges 86 and two different piercing edges 84 whereby, by reversing and re-orienting the positions of mounting thereof on jaw 20, four different cutting edges and two different piercing edges can be presented for use before replacement of the blades is necessary. Thus, the life of the individual blade members is optimized and manufacturing and maintenance costs are advantageously reduced.

While considerable emphasis has been placed herein on the geometric configuration of the piercing and cutting tip blades 62 and 64, it will be appreciated that numerous geometric configurations can be employed to enable re-orientation and reversal of the blades for the purposes set forth above. Two such additional geometric configurations are shown in FIGS. 10 and 11 of the drawing and, as will become apparent from the descriptions thereof hereinafter, certain additional advantages and/or increased versatility can be obtained therewith. In these embodiments, the cutting edges and piercing edges of the blades are designated by the numerals used in FIGS. 2–5, namely 86 for the cutting edges and 84 for the piercing edges.

With regard first to FIG. 10, the geometric configuration of cutting and piercing tip blade 88 shown therein is that of an equilateral triangle. Blade 88 has parallel, planar opposite sides 88a and 88b and a mounting opening 90 centrally therethrough and which, as will be appreciated from the description hereinabove, would be countersunk at the opposite ends thereof or internally threaded for a pair of the blades to be mounted on jaw 20 in the manner described. With regard to such mounting, it will be appreciated that recesses 68 and 70 in the distal end of jaw 20 would be contoured to correspond with the peripheral contour of blade 88, that the portion of jaw 20 therebetween would be provided with a single opening and that the blades would be mounted on the jaw using a single fastener 66. The equilateral triangle configuration of blade 88 advantageously provides the latter with six cutting edges 86 and three piercing edges 84 and, while it is possible to reverse the mounting of a pair of blades 88 with respect to the opposite sides of jaw 20, it will be appreciated that each blade 88 can be mounted on one side and re-oriented relative thereto so as to selectively position all of the cutting edges and piercing edges for cooperable severing relationship with the blades on lower jaw 18 when jaw 20 closes relative thereto. In this respect, blade 88 can be rotated about the axis of mounting opening 90 to sequentially position cutting edges 86 and a piercing edge 84 relative to the lower jaw, and the blade can be rotated 180° about an axis bisecting the angle between adjacent cutting edges 86 to reverse the positions of the two planar sides relative to jaw 20. The blade can then again be rotated about the axis of mounting opening 90 to sequentially present cutting edges 86 and a piercing edge 84 in positions for cooperative shearing relation with the blades on lower jaw 18.

FIG. 11 illustrates a cutting and piercing tip blade 92 in the geometrical form of a trapezium. Blade 92 has planar, parallel opposite sides 92a and 92b and a pair of mounting openings 94 therethrough which would either be countersunk at their opposite ends or internally threaded for the purpose set forth hereinabove. Blade 92 provides four cutting edges 86 and two piercing edges 84 in a manner similar to that of blades 62 and 64, and blade 92 is adapted to be re-oriented relative to a given side of mounting thereof by rotating the blade 180° about an axis bisecting the angle between peripherally adjacent cutting edges 86 on one side of the blade. Moreover, blades 92 are adapted to be reversed as a pair with respect to the opposite sides of jaw 20.

Another geometrical configuration for the cutting and piercing tip blade is that of an equilateral parallelogram in which the four edges on each side of the blade from either a square or a rhombus. Such a blade in which the edges from a square provides four cutting edges on each side and four piercing edges therebetween, one at each of the corners of the blade. Such a blade in the form of a rhombus also provides four cutting edges on each side and two piercing edges therebetween, one at each of the corners between the edges which are at an acute angle to one another. The rhombus blade configuration provides for re-orienting the blade relative to one side of jaw 20 to sequentially present four of the eight cutting edges and the two piercing edges thereof in positions for shearing cooperation with the blades on lower jaw 18, and provides for the blade to be reversed, mounted on the opposite side of jaw 20 and re-oriented relative thereto to sequentially present the other four of the eight cutting edges and the two piercing edges in the shearing positions thereof. The square blade configuration, depending on the number and orientation of the mounting openings therethrough, can provide for re-orientation and reversal of mounting relative to a given side of jaw 20 to selectively position all eight cutting edges and the four piercing edges thereof for cooperable severing relationship with the blades on lower jaw 18. Alternatively, as with the equilateral triangle configuration of blade 88 in FIG. 10, the square blades can be reversely mounted as a pair with respect to the opposite sides of jaw 20.

While considerable emphasis has been placed on preferred embodiments illustrated and described herein, it will be appreciated that other embodiments as well as modifications of the preferred embodiments can be made without departing from the principles of the invention. In particular in this respect, it will be appreciated that numerous geometric peripheral configurations can be devised for the piercing and cutting tip blades, such contour depending in part on the structure and contour of the distal end of the jaw of the shear on which the blades are mounted and the type and character of material to be handled by the shear. Moreover, while disclosed herein as being mounted on the distal end of the pivotal jaw of a shear having fixed and pivotal jaws, it will be appreciated that the piercing and cutting tip blades could be mounted on one of a pair of jaws which are both pivotal relative to a supporting structure therefor. Further, while it is preferred to mount a pair of blades in the manner disclosed, namely through the use of countersunk openings in one blade and threaded openings in the other, it will be appreciated that other mounting arrangements can be provided, including the individual mounting of each blade on the jaw. Still further, while the preferred embodiment includes a jaw provided with a pair of piercing and cutting tip blades, it will be appreciated that the use of a single blade is possible depending on the structure of the shear. In this respect, it is only necessary in accordance with the invention that the blade have at least two cutting edges on opposite sides thereof and a piercing edge between the opposite sides so as to provide for re-orienting the mounting of the blade on the jaw for selectively positioning one of the plurality of cutting edges and a piercing edge relative to corresponding blades or edges on the other jaw of the shear. These and other embodiments of the invention as well as other modifications of the preferred embodiments herein illustrated and described will be obvious to those skilled in the art, whereby it is to be distinctly understood that the foregoing descriptive matter is to be interpreted merely as illustrative of the present invention and not as a limitation.

Having thus described the invention, it is claimed:

1. In a heavy duty shear head attachable to the boom of a mobile machine and comprising relatively pivotal shearing means including first jaw means, second jaw means, means supporting said first and second jaw means for relative pivotal displacement between open and closed positions, blade means on said first and second jaw means cooperable to shear a workpiece therebetween during relative displacement of said first and second jaw means from said open toward said closed position and including cutting and piercing tip means on one of said first and second jaw means and cutting and piercing edges for said tip means on the other, and means for relatively pivoting said jaw means, the improvement comprising: said tip means being removably mountable on said one jaw means and having planar opposite sides, said tip means having a plurality of cutting and piercing edges including at least one cutting edge in the plane of each of said opposite sides and at least two piercing edges between said opposite sides, and said tip means being mountable on said one jaw means in a plurality of different positions each selectively positioning a different one of said cutting edges and one of said piercing edges in shearing relation to said cutting and piercing edges on the other of said jaw means.

2. The improvement according to claim 1, wherein said one jaw means is pivotal about a corresponding jaw axis and has axially opposite sides, said tip means including tip blade means on each said opposite sides.

3. The improvement according to claim 2, wherein each said tip blade means is selectively mountable on each of said opposite sides.

4. The improvement according to claim 1, wherein said one jaw means is pivotal about a corresponding jaw axis, said at least one cutting edge and said two piercing edges in said shearing relation respectively extending transverse to said jaw axis and parallel thereto.

5. The improvement according to claim 1, wherein said plurality of cutting and piercing edge means includes a plurality of coplanar linear cutting edges on each of said opposite sides of said tip means and a plurality of linear piercing edges transverse to the planes of said opposite sides.

6. The improvement according to claim 5, wherein the coplanar cutting edges on each side are at an angle to one another.

7. The improvement according to claim 6, wherein said angle is 90°.

8. The improvement according to claim 6, wherein said angle is an oblique angle.

9. The improvement according to claim 5, wherein the plurality of linear cutting edges on one of said opposite sides is aligned with the plurality on the other side in the direction between said opposite sides.

10. In a heavy duty shear head attachable to the boom of a mobile machine and comprising relatively pivotal shearing means including first jaw means, second jaw means, means supporting said first and second jaw means for relative pivotal displacement about jaw axes between open and closed positions, blade means on said first and second jaw means cooperable to shear a workpiece therebetween during relative displacement of said first and second jaw means from said open toward said closed positions and including cutting and piercing tip means on one of the said first and second jaw means and cutting and piercing edges on the other, and means for relatively pivoting said jaw means, the improvement comprising: said one jaw means having axially opposite first and second sides, said tip means including a pair of tip blades removably mountable on said first and second sides, each said tip blade when mounted having axially spaced apart outer and inner cutting edges and a piercing edge therebetween, said outer edge and said piercing edge being positioned in shearing relation to said cutting and piercing edges on the other of said jaw means, and means for selectively mounting each of said tip blades on either one of said first and second sides.

11. In a heavy duty shear head attachable to the boom of a mobile machine and comprising relatively pivotal shearing means including first jaw means, second jaw means, means supporting said first and second jaw means for relative pivotal displacement about jaw axes between open and closed positions, blade means on said first and second jaw means cooperable to shear a workpiece therebetween during relative displacement of said first and second jaw means from said open toward said closed positions and including cutting and piercing tip means on one of the said first and second jaw means, and means for relatively pivoting said jaw means, the improvement comprising: said one jaw means having axially opposite first and second sides, said tip means including a pair of tip blades removably mountable on said first and second sides, each said tip blade when mounted having axially spaced apart outer and inner cutting edges and a piercing edge therebetween, said outer edge being positioned in shearing relation to the other of said jaw means, and means for selectively mounting each of said tip blades on either one of said first and second sides, said means for mounting including first opening means through said one jaw means between said opposite sides thereof, second opening means through each said pair of tip blades for alignment with said first opening means, and fastener means extending through said first and second opening means and axially engaging said tip blades against said opposite sides of said one jaw means.

12. The improvement according to claim 11, wherein said second opening means through one of said pair of tip blades is threaded and said fastener means includes shank means having a threaded end in threaded engagement with said second opening means through said one tip blade.

13. The improvement according to claim 12, wherein said shank means includes head means on the end thereof opposite said threaded end and said second opening means through the other of said pair of tip blades has axially opposite ends which are axially inwardly recessed to receive said head means.

14. The improvement according to claim 10, wherein said outer and inner cutting edges are transverse to said jaw axes and said piercing edge is parallel thereto.

15. The improvement according to claim 10, wherein said outer and inner cutting edges are first outer and inner cutting edges and each said tip blade includes second outer and inner cutting edges respectively coplanar with said first outer and inner cutting edges.

16. The improvement according to claim 15, wherein said coplanar cutting edges are at an angle to one another.

17. The improvement according to claim 16, wherein said angle is 90°.

18. The improvement according to claim 16, wherein said angle is an oblique angle.

19. In a heavy duty shear head attachable to the boom of a mobile machine and comprising relatively pivotal shearing means including first jaw means, second jaw means, means supporting said first and second jaw means for relative pivotal displacement about jaw axes between open and closed positions, blade means on said first and second jaw means cooperable to shear a workpiece therebetween during relative displacement of said first and second jaw means from said open toward said closed positions and including cutting and piercing tip means on one of the said first and second jaw means, and means for relatively pivoting said jaw means, the improvement comprising: said one jaw means having axially opposite first and second sides, said tip means including a pair of tip blades removably mountable on said first and second sides, each said tip blade when mounted having axially spaced apart outer and inner cutting edges and a piercing edge therebetween, said outer edge being positioned in shearing relation to the other of said jaw means, and means for selectively mounting each of said tip blades on either one of said first and second sides, said outer and inner cutting edges being first outer and inner cutting edges and each said tip blade including second outer and inner cutting edges respectively coplanar with said first outer and inner cutting edges, said coplanar cutting edges being at an angle to one another, said means for mounting including first opening means through said one jaw means between said opposite sides thereof, second opening means through each said pair of tip blades for alignment with said first opening means, and fastener means extending through said first and second opening means and axially engaging said tip blades against said opposite sides of said one jaw means.

20. The improvement according to claim 19, wherein said second opening means through one of said pair of tip blades is threaded and said fastener means includes shank means having a threaded end in threaded engagement with said second opening means through said one tip blade.

21. The improvement according to claim 20, wherein said shank means includes head means on the end thereof opposite said threaded end and said second opening means through the other of said pair of tip blades has axially opposite ends which are axially inwardly recessed to receive said head means.

* * * * *